C. A. PATTERSON.
MANUFACTURE OF FLOUR.
APPLICATION FILED AUG. 3, 1911.
1,163,168.
Patented Dec. 7, 1915.
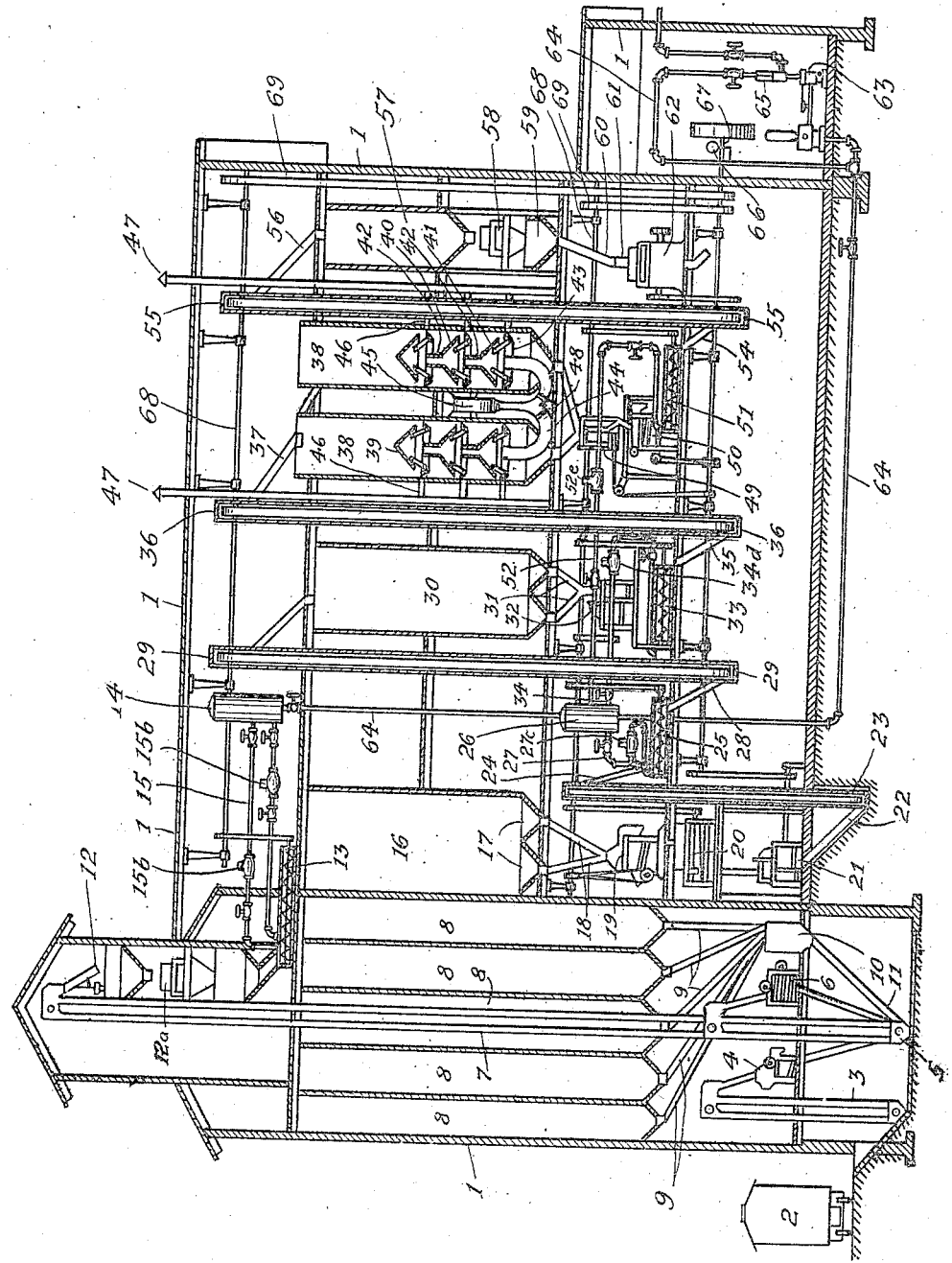
Witnesses:
Amy Jehle
J. H. McElroy
Inventor:
Clarence A. Patterson
By Fred Gerlach
his Attorney.

UNITED STATES PATENT OFFICE.

CLARENCE A. PATTERSON, OF WINONA, MINNESOTA.

MANUFACTURE OF FLOUR.

1,163,168. Specification of Letters Patent. Patented Dec. 7, 1915.

Application filed August 3, 1911. Serial No. 642,199.

*To all whom it may concern:*

Be it known that I, CLARENCE A. PATTERSON, a resident of Winona, in the county of Winona and State of Minnesota, have invented certain new and useful Improvements in the Manufacture of Flour, of which the following is a full, clear, and exact description.

The invention relates to the treatment of wheat preparatory to grinding it into flour.

In the manufacture of flour from wheat, treatment of the wheat before being ground, so that the greatest amount of flour of the highest and best quality will be produced, has long been a desideratum.

It has long been recognized that the use of chemicals for treating the wheat, results in what is generally regarded as an adulterated product and for that reason such treatment has not found favor and has been prohibited. Most high grade wheat-flours are more or less yellow when freshly milled, and although the flour fades somewhat, after it is stored for a period in a well-lighted place, the yellow tint remains more or less and to overcome this tint, various bleaching processes have been introduced into the flour mills, but the bleaching agent employed, usually peroxid, has been regarded as containing substances injurious to the health, and this flour possesses inferior bread-making properties, particularly, if material quantities of bleaching-agents are employed. In practice it has also been found that artificial heat for drying out the wheat causes it to become brittle and lifeless; and that treating the wheat with steam causes discoloration of the flour. A large percentage of water in flour is regarded as conducive to unsoundness, and the interior constituents of the wheat, especially the soluble proteins and acids are acted upon by moisture in the presence of heat and causing fermentation in the flour, which produces sourness.

One object of the present invention is to provide an improved method for treating wheat preparatory to grinding it into flour, which avoids, the use of chemicals, artificial heat, and steam, and the resultant deterioration of the flour, but which causes the flour to be perfectly white and of the highest possible grade or quality.

It has heretofore been proposed to moisten wheat to facilitate removal of the husks or covers and also to moisten the grain and then dry it out again.

A further object of the invention is to provide an improved process by which the wheat will not only be moistened to facilitate removal of the coatings or husks but also to moisten the interior substances of the wheat-berries, in such manner that the necessity of drying out the wheat artificially by heat or steam and resultant discoloration of the flour, will be avoided.

In practice it has been found that repeatedly moistening the interior substances of the wheat, and then tempering the wheat for a sufficient period, and without subjecting the wheat to artificial heat or steam, whitens and improves the quality of the wheat. Furthermore the interior substances and fibrous pulp are whitened and toughened and the exterior fibrous coats can be easily separated from the starchy and glutinous substances. By extended experiments it has been found that repeated wetting, cleaning and tempering of the wheat under proper conditions and regulations will cause the wheat, when ground, to make a white flour of the highest grade. It has also been found that a single wetting of the grain will not cause all the moisture necessary to treat the interior substances of the wheat, so that when ground the product will be improved thereby.

It is furthermore important in the art of milling flour, when attempt is made to moisten the wheat preparatory to grinding, that excessive moisture in the flour be avoided, and in practice I have found that by repeatedly moistening the wheat with the proper quantities of water and continuing tempering the wheat for the proper period the resultant product will be perfectly white flour, will not contain excessive moisture, and will, in fact, be as white as when the bleaching process heretofore employed was used. Furthermore, by the improved method hereinafter set forth, which includes repeated wetting, tempering, and cleaning, and treating the moist wheat to a current or blast of cold air, new wheat will be treated in such manner that when milled, it will, at the outset, produce a normal loaf of bread, because the necessary fermentation changes will rapidly occur during and be facilitated by the process.

Heretofore in wetting wheat to facilitate removal of the husks or covers, or in moistening the wheat and then treating the wheat with artificial heat, the grain has been imperfectly or indifferently treated and another object of the invention is to provide an improved process or method which will insure uniform and proper moistening of the grain to cause the product to be free from woody fiber, germ, and all other impure substances and to be a high grade and perfectly white flour.

The invention consists in the improvements hereinafter set forth and more particularly defined by claims at the conclusion hereof.

The drawing illustrates diagrammatically a plant embodying an apparatus for carrying out the improved process.

The improved process is carried out in the following manner: The wheat is first cleaned to remove the straw, chaff and other substances from the wheat; next it is thoroughly cleaned in a milling separator and then conducted to a series of storage bins. A certain percentage of wheat is drawn from each bin and mixed together, and next it is weighed, or measured. In weighed and regular quantity, the wheat is delivered into a mixing-conveyer into which water is introduced in regulated quantity, (according to dryness, of the wheat) and sufficient for all moisture which the wheat will absorb. By measuring the quantity of water supplied to this mixing conveyer, the miller will know exactly how much water is being mixed with each bushel of wheat and can maintain an even and proper mixture of water and wheat. The purpose of thoroughly wetting the wheat is to cause all the moisture possible to penetrate to the center of each kernel of wheat, to whiten and toughen the interior substances, and the interior fibrous pulp and to toughen the exterior fibrous coatings, so they can be easily separated from the starchy and glutinous substances and will not break up into particles in grinding, and therefore the separation of the coatings, germ, and woody fiber in the bolting machines is facilitated.

After the wheat has been thoroughly moistened, it is delivered into a tempering bin which has a capacity of six bushels of wheat for each barrel of the grinding capacity of a run of twenty four hours, and this bin is kept continuously filled to its full capacity during the operation of the plant. Next the tempered and wet wheat is drawn from the tempering bin and treated in a milling separator, wherein the wheat is subjected only to a moderate blast or suction to avoid carrying off too much of the moisture from the wheat. Next, if there is cockle in the wheat, it is subjected to treatment in a cockle machine, and if not, then the wheat is scoured and in the scouring-machine it is subjected to only a moderate suction to again avoid removal of too much of the moisture in the wheat. Then, the wheat which has been scoured, is again delivered to a mixing-conveyer to which water in measured regular quantity is supplied and the quantity of water supplied to and mixed with the wheat in this conveyer, will be all that the wheat can absorb, to keep tempering constantly progressing. Next the wheat is further tempered in a bin having a capacity of four bushels for each barrel of grinding capacity in a 24 hour run and this bin is kept continuously full.

In transit through the first tempering bin the milling separator and scouring machine, the wheat will lose some of its moisture and for this reason it is moistened in the mixing conveyer a second time and is permitted to remain in a second tempering-bin to which it is delivered after having been moistened a second time, so that the wheat will absorb moisture in the second tempering bin. After being tempered in this last mentioned bin the wheat is again scoured and passed through a scouring machine, and is again moistened in a mixing-conveyer, to which the grain and water are delivered in regulated and measured quantity, and the supply of water will again be all that the wheat will absorb, to further toughen the constituents of the wheat and to prevent the husks from breaking into small particles while being ground. After being moistened the third time, the wheat is conducted to two air-tight tempering-bins each having a capacity of ½ bushel of wheat for each barrel of grinding capacity of the mill for a 24 hour run, and which is kept continuously full. In these air-tight tempering-bins, the wheat is subjected to a blast of cold air, the wheat column being divided or separated as it passes through the bins to cause all of the grain to be thoroughly subjected to the air blast. The cold air current at this stage of the process, equalizes the tempering and whitening of the internal substances, carries off excessive moisture in the wheat, if any, and if there is no excess of moisture, the air-current is regulated according to the moisture in the wheat, or may be shut off if there is no excess, as the tempering and whitening of the wheat may require. If it is found that the wheat contained in the last mentioned tempering bins does not contain sufficient moisture, this may be supplied by increasing the amount of water supplied to the wheat in the earlier steps of the process. If the wheat in the air-tight bins in which it is subjected to a cold air blast is found to be too dry, water may be added in a subsequent step of the process.

After the wheat passes through the tempering bins through which the air-blast is forced, it is scoured in a scouring machine and passed through a milling-separator both of which, should have only moderate suction, to avoid removing too much of the moisture. Next the wheat is conducted to a mixing conveyer to which water in measured and regulated quantity is supplied and only sufficient to keep the tempering and whitening process constant, until the wheat reaches the grinding rolls. From the last mentioned mixing-conveyer the wheat is delivered to a bin having a capacity of ⅛ bushel of wheat for each barrel of flour of the grinding capacity of the mill for a 24 hour run. From this bin the wheat is delivered to an automatic weighing apparatus by which the tempered and whitened wheat, in measured quantities is delivered to the first break rolls.

In the successful conduct and operation of this tempering and whitening process, it requires from 36 to 48 hours for the treatment, from the time of the first wetting of the wheat to the grinding in the first break rolls. The process thus exemplifies, one by which the wheat is repeatedly and successively moistened and tempered, and is otherwise treated so that the tempering and whitening process is maintained for a period ranging from 36 to 48 hours.

It will be observed that the use of chemicals, electricity, lime, hot-air, live-steam, and hot-water are all avoided in the improved process and thereby the drying-out, discoloration or deterioration of the flour made from the wheat, is also avoided.

In the apparatus illustrated in the drawing as an exemplification of one employed in carrying out the invention, 1 designates a suitable building or structure containing the apparatus, and 3 a short elevator-leg for conducting the wheat to a scalping separator 4 having a strong suction for removing straw, chaff and other coarse substances from the wheat. Another short elevator-leg 5 conducts the wheat from separator 4, to a milling separator 6 for more thoroughly cleaning the wheat. A long elevator leg 7 elevates the wheat from separator 6 to a series of storage bins 8. A certain percentage of grain is drawn from each of these bins and mixed, to maintain a certain percentage of milling quality, and passes through discharge-spouts 9, to a mixing-hopper 10, from which the wheat is conducted by a discharge-spout 11 to the boot of elevator-leg 7 by which it is again elevated to the cupola of the elevator and there discharged by a distributing-spout 12 into the hopper of an automatic recording and self-dumping weighing scale 12ª, which delivers the wheat into a spiral or screw mixing-conveyer 13 located in the cupola of the elevator and mill. As the wheat enters conveyer 13, water is mixed with it, the water being delivered from a supply tank 14, through two pipes 15, each of which is provided with two regulating valves. One of these valves is to regulate the flow of the water, while the other two valves are for shutting off the water entirely. The water passes to conveyer 13 through two high quality water-meters 15ᵇ, which register the quantity of the water used in U. S. gallons. The quantity of the water to be supplied and mixed with the wheat in conveyer 13, will be in accordance with the condition and quality of the wheat and to supply all the moisture, which the wheat will absorb. If the wheat is hard and very dry it will absorb about two and one-fourth U. S. gallons of water to the bushel in the summer and one and three-fourths U. S. gallons of water to the bushel in winter, and the wet wheat is discharged into a tempering bin 16. It is a well known fact, that on account of the low temperature in the winter, wheat will not absorb the amount of water that it will in the summer, but the freezing of the wheat and water is very beneficial in whitening and toughening the internal substances.

With the automatic recording and self-dumping weighing scales 12ª registering in bushels, and the water meters 15ᵇ registering in U. S. gallons, the miller will know exactly how much water he can mix with each bushel of wheat, and maintain an even mixture of wheat and water. The object of such thorough wetting is to cause all the moisture possible to penetrate to the center of each kernel of wheat, to whiten and toughen the interior substances. The exterior fibrous coatings are also toughened so that they can be easily separated from the starchy and glutinous substances, and will not break up into minute particles in grinding, and therefore can be easily separated by the bolting machines.

Tempering bin 16 preferably has a four-opening hopper-bottom 17, and has a capacity for storing six bushels of wheat for each barrel of the mill's actual grinding capacity for each twenty-four hours' run, and in practice this bin should be kept continuously filled to its full capacity during the operation of the plant.

From the tempering bin 16 the wet wheat is drawn off through the discharge spouts 18 to a milling separator 19, the suction of which should be only moderate to avoid removing too much of the moisture from the wheat. Thence the wheat may, if necessary, be run to a cockle machine 20, or if there is no cockle in the wheat, then direct from the separator 19 to a scouring machine 21, which, also, should have but moderate suction.

The wheat flows through a discharge spout 22 to the boot of an elevator-leg 23 which delivers it through a discharge-spout 24, into a spiral or screw mixing-conveyer 25. Here the wheat is again mixed with water from supply-tank 26, the water passing through a pipe 27, which is provided with two regulating valves, one of which regulates the flow of the water, while the other shuts off the water entirely. The water in pipe 27 flows through a high quality water meter $27^c$, which registers the quantity of the water used in U. S. gallons. The quantity of the water to be supplied and mixed with the wheat in conveyer 25, will be all the wheat can absorb to maintain the continuity of the tempering and whitening process.

From mixing-conveyer 25, the wheat flows through a discharge spout 28 to an elevator-leg 29 which elevates it and discharges it into a tempering-bin 30. This tempering bin has a four-opening hopper bottom, and has a capacity for storing four bushels of wheat for each barrel of the mill's actual grinding capacity for each twenty-four hours' run, and is kept continuously filled to its full capacity. The wheat in transit from the tempering bin 16 to the conveyer 25, has lost a portion of its moisture, and for this reason further time and opportunity for the absorption of water is given by its storage in tempering-bin 30.

The wheat flows from the tempering-bin 30 through discharge-spouts 31 and is discharged into a scouring machine 32, whence it flows into a spiral or screw mixing-conveyer 33. Here the wheat is again mixed with water from supply tank 26, the water passing through a pipe 34, which is supplied with two regulating valves, one of which regulates the flow of the water, while the other shuts off the water entirely. This water flows through a high quality water meter $34^d$, in this pipe, and registers the quantity of the water used in U. S. gallons. The quantity of the water to be supplied and mixed with the wheat in conveyer 33, will be all the wheat can absorb moisture to toughen the wheat coatings, if they are found to be too dry, so that the bran will flake off, and not break up into small particles while grinding through the rolls.

From the conveyer 33, the wheat flows through a discharge spout 35 to an elevator-leg 36 which elevates it into a discharge-spout 37 which delivers the wheat into two round galvanized steel air-tight tempering-bins 38, each of which has a capacity for storing one-half bushel of wheat for each barrel of the mill's actual grinding capacity for each twenty-four hours' run, and are kept continuously filled to their full capacity. These bins are each provided with a vertical series of cone-shaped spreaders 39, 40, and 41. The upper spreaders 39 each have a closed top, while the other cones each have central or dome-openings 42 at the top. Below each spreader-hopper there is a deflector-ring 43 that is secured to the sides of the bins, to deflect the wheat toward the center of the bin. An air-pipe 44 extending from a blower 45, discharges a blast beneath and through the spreader 41 in each bin 38, so that the cold air-currents will pass upward through the dome-openings in the two lower spreaders and strike the top spreader 39. Branch-pipes 46 connect each bin with an exhaust-pipe 47 which leads to the atmosphere. The currents of cold air through the pipes 44 may be regulated as desired, by gates or valves 48 in each pipe. Providing the cold air-currents at this stage of the process, equalizes the tempering and whitening at this point, and if the wheat contains too much moisture the excess will be removed by blowing cold air through the wheat, and if the wheat is found not to contain enough moisture, the air-currents can be regulated or shut off entirely, as the tempering and whitening of the wheat may require. If, at this point, the wheat in tempering bins 38 does not contain enough moisture, more water should be mixed with the wheat during earlier steps of the process. The wheat in the tempering-bins 38, if found to be too dry, can be given more water at a subsequent stage of the process.

From the tempering-bins 38, the wheat flows to a scouring machine 49 and thence to a milling-separator 50, and both of these machines should have only moderate suction to avoid overdrying of the wheat. From milling-separator 50, the wheat flows to another screw or spiral mixing-conveyer 51. Here, the wheat is mixed with water from supply tank 26, which supplies water through a pipe 52, which is supplied with two valves, one of which regulates the flow of the water, while the other shuts it off entirely. The water flows through a high quality water meter $52^e$, that is connected to this pipe, and registers the quantity of the water used in U. S. gallons. The quantity of the water to be supplied and mixed with the wheat in conveyer 51, will be all that is necessary to maintain the tempering and whitening process until the wheat reaches the rolls.

From the conveyer 51, the wheat flows through a discharge-spout 54 to an elevator-leg 55 which elevates it and discharges it into discharge spout 56 to a roll-supply bin 57. This bin must have a capacity for storing one-fifth bushel of wheat for each barrel of the mill's actual grinding capacity for each twenty-four hours' run. From supply bin 57, the wheat flows into an automatic recording and self-dumping weighing scale 58 which discharges the wheat into a feed-hopper 59 over the first break-rolls. The feed-hopper 59 should have a storage capacity of four times that of the automatic weighing scale 58. From the feed-hopper, the wheat flows through a discharge-spout 60 to an automatic feed-governor 61 by which it is fed to the first break-rolls, of a roller mill 62, whereby the wheat is ground.

In the successful conduct and operation of this tempering and whitening process, practice has demonstrated that it requires from thirty-six to forty-eight hours for the treatment, i. e. from the time of the first wetting of the wheat to the grinding in the first break-rolls.

To maintain a sufficient water-pressure (preferably about fifty pounds) a suitable steam pump 63 is installed in the boiler or engine-room and is connected by pipes 64 with the water-tanks 14 and 26 which supply water to mixing conveyers. A suitable automatic pressure governor 65 is provided to regulate the steam passing to the pump to cause the pump to automatically maintain uniform pressure in the water-supply system. A pressure gage 66 is located in the water pipe. This water-supply system is known as a "closed system."

The various machines described are driven by means of a line-shaft 67, counter and head shafts 68, 69 and suitable belts and pulleys.

Tempering and whitening wheat for the period and in the manner set forth, preparatory to grinding, results in the manufacture of a purer flour in separation, whiter flour in color, and with less wheat per barrel, than can be made from any other process known to me, and it is believed that these results are attained because the water added by repeated wetting of the wheat, for a long period in advance of the grinding and tempering produces a chemical action on the wheat, which bleaches the wheat naturally, both internally and externally.

The process thus set forth in connection with the apparatus, thus exemplifies one in which the grain is automatically handled on a time schedule, which causes the product to be uniform in quality and whiteness. Manifestly, the use of any chemicals, electricity, lime, hot-air, live-steam, hot-water, steamers or heaters, and the resultant deterioration or effect upon the flour, are all avoided.

The precise practice set forth may be varied or departed from within the scope of the appended claims without departing from the spirit and scope of the invention. For example, while the tempering process has been set forth extending over a period ranging from 36 to 48 hours, it is believed that in a measure, the results sought may be attained if the tempering process lasts for a period of about 30 hours, though the best results are obtained from longer periods in tempering.

Having thus described the invention what I claim as new and desire to secure by Letters Patent is:

1. That improvement in the manufacture of flour, which consists in repeatedly wetting the wheat and tempering it for a period not less than thirty hours and then grinding the tempered wheat.

2. That improvement in the manufacture of flour, which consists in repeatedly wetting the wheat and tempering it continuously for a period not less than thirty hours, and then grinding the tempered wheat.

3. That improvement in the manufacture of flour, which consists in repeatedly wetting the wheat and tempering it for a period not less than thirty hours, cleaning the wheat between the wettings, and then grinding the tempered wheat.

4. That improvement in the manufacture of flour, which consists in repeatedly wetting the wheat and tempering it for a period not less than thirty hours, cleaning the wheat between the wettings without discontinuing the tempering process, and then grinding the tempered wheat.

5. That improvement in the manufacture of flour, which consists in repeatedly wetting the wheat, tempering it for thirty hours or more to cause the moisture to penetrate and whiten the interior substances of the wheat-berry, and grinding the wheat without removing the moisture from the internal substances of the wheat-berry.

6. That improvement in the manufacture of flour, which consists in repeatedly wetting the wheat, tempering it for thirty hours or more to cause the moisture to penetrate and whiten the interior substances of the wheat-berry, cleaning the wheat between the wettings, and grinding the wheat leaving the moisture in the internal substances of the wheat-berry.

7. That improvement in the manufacture of flour, which consists in repeatedly wetting the wheat, tempering it for thirty hours or more to cause the moisture to penetrate and whiten the interior substances of the wheat-berry, then subjecting the wheat to a current of cold-air to equalize the tempering, and grinding the wheat with the moisture in the internal substances of the wheat-berry.

8. That improvement in the manufacture of flour, which consists in cleaning the wheat, repeatedly wetting the wheat, and tempering it for thirty hours or more to whiten the internal substances of the wheat-berry, repeatedly cleaning the wheat between the wettings without discontinuing the tempering process, then subjecting the wheat to a current of cold air, then again wetting the wheat, and then delivering the wheat to the first break-rolls.

9. That improvement in the manufacture of flour, which consists in cleaning the wheat, repeatedly wetting the wheat and tempering it for thirty hours or more to whiten the internal substances of the wheat-berry, repeatedly cleaning the wheat between the wettings, without discontinuing the tempering process, then subjecting the wheat to a current of cold air, then cleaning the wheat without interrupting the tempering process, then again wetting the wheat, and then delivering the wheat to the first break-rolls.

10. That improvement in the manufacture of flour, which consists in repeatedly wetting a measured quantity of wheat, with water in measured quantity, and tempering the wheat for a sufficient period to cause the moisture to penetrate and whiten the interior substances of the wheat-berry.

11. That improvement in the manufacture of flour, which consists in wetting a measured quantity of wheat with water in measured quantity, tempering the wheat for a sufficient period to cause the moisture to penetrate and whiten the interior substances of the wheat-berry, and then passing it to the first break-rolls, and treating the wheat only with air which has not been artificially heated.

12. The process of treating wheat for the manufacture of flour, which consists in measuring water, and mixing it with a measured quantity of moving wheat, passing the mixture slowly through a tempering bin on a time schedule, to allow the moisture to penetrate the wheat kernels, and next conducting the moistened wheat through a cleaning machine for cleaning the kernels.

13. The process of treating wheat for the manufacture of flour, which consists in repeatedly mixing water in measured quantity with wheat in transit at a known quantity, passing the mixture slowly through tempering bins successively on a time schedule, subjecting the wheat to the action of cleaning machines for cleaning the wheat kernels between the wettings, and subjecting the moistened wheat to the action of cold air-currents before it flows to the first break-rolls.

14. The process of treating wheat for the manufacture of flour, which consists in mixing a measured quantity of water with moving wheat of a known quantity, passing the mixture slowly through a tempering bin on a time schedule, to allow the moisture to penetrate the wheat kernels, next conducting the moistened wheat through a cleaning machine for cleaning the kernels, and repeating such steps before feeding the wheat to the first break-rolls.

15. The process of treating wheat for the manufacture of flour, which consists in mixing water with the moving wheat at a known quantity, passing the mixture slowly through a tempering bin, having a capacity of six bushels of wheat for each barrel of the mill's grinding capacity for twenty-four hours' run on a time schedule, to allow the moisture to penetrate the wheat kernels, and next conducting the moistened wheat through a cleaning machine for cleaning the kernels.

16. The process of treating wheat for the manufacture of flour, which consists in measuring water, and mixing it with moving wheat of a known quantity, passing the mixture slowly through a tempering bin on a time schedule, having capacities of six bushels of wheat for each barrel of the mill's grinding capacity for twenty-four hours' run, to allow the moisture to penetrate the wheat kernels, next to clean the kernels, repeating like operations through tempering bins having capacities of four bushels and one-half bushels each, for each barrel of the mill's grinding capacity for twenty-four hours' run, and conducting the wheat thence to a roll supply bin and thence to the first break-rolls.

CLARENCE A. PATTERSON.

Witnesses:
 EDWARD LEES,
 MARGARET GARNVES.